US011383248B2

(12) United States Patent
Narciso

(10) Patent No.: US 11,383,248 B2
(45) Date of Patent: Jul. 12, 2022

(54) VENTILATION ASSEMBLY

(71) Applicant: HSD Holding Smart Device S.r.l., Rome (IT)

(72) Inventor: Paolo Narciso, Rome (IT)

(*) Notice: Subject to any disclaimer, the term of this patent is extended or adjusted under 35 U.S.C. 154(b) by 88 days.

(21) Appl. No.: 15/733,578

(22) PCT Filed: Feb. 20, 2019

(86) PCT No.: PCT/IB2019/051379
§ 371 (c)(1),
(2) Date: Sep. 2, 2020

(87) PCT Pub. No.: WO2019/171195
PCT Pub. Date: Sep. 12, 2019

(65) Prior Publication Data
US 2020/0391222 A1    Dec. 17, 2020

(30) Foreign Application Priority Data

Mar. 8, 2018 (IT) .................. 102018000003381

(51) Int. Cl.
| | |
|---|---|
| *B03C 3/00* | (2006.01) |
| *B03C 3/145* | (2006.01) |
| *B01D 45/08* | (2006.01) |
| *B01D 46/00* | (2022.01) |
| *F24F 13/28* | (2006.01) |

(Continued)

(52) U.S. Cl.
CPC .............. *B03C 3/145* (2013.01); *B01D 45/08* (2013.01); *B01D 46/0032* (2013.01); *B01D 50/20* (2022.01); *F24F 8/10* (2021.01); *F24F 13/28* (2013.01); *B01D 2279/35* (2013.01)

(58) Field of Classification Search
CPC ........ B03C 3/145; B01D 45/08; B01D 45/12; B01D 45/16; B01D 46/0032; B01D 50/20; B01D 2279/35; F24F 8/10; F24F 13/28
See application file for complete search history.

(56) References Cited

U.S. PATENT DOCUMENTS

| | | | |
|---|---|---|---|
| 4,337,157 A * | 6/1982 | Bradley ................. | B01D 15/00 210/691 |
| 5,015,381 A | 5/1991 | Ellion | |

(Continued)

FOREIGN PATENT DOCUMENTS

| | | |
|---|---|---|
| CN | 204395631 U | 6/2015 |
| CN | 204474342 | 7/2015 |

(Continued)

*Primary Examiner* — Dung H Bui
(74) *Attorney, Agent, or Firm* — Themis Law

(57) ABSTRACT

A ventilation assembly includes an air intake channel; a delivery channel; a generating device of an air stream between the intake channel and the delivery channel; a filtering section of the air stream to decrease, if not eliminate, the presence of particulate in the air stream. The filtering section includes a filter having a containment body provided with an intake opening and a delivery opening for the air stream passing therethrough, and air-tight bulkheads, arranged inside the containment body and shaped to force the air stream to collide therewith and with the inner walls of the containment body, the bulkheads and the containment body having a section portion suitable for being penetrated by the particulate in the air stream so as to retain it therein.

8 Claims, 2 Drawing Sheets

(51) Int. Cl.
*F24F 8/10* (2021.01)
*B01D 50/20* (2022.01)

(56) References Cited

U.S. PATENT DOCUMENTS

| | | | |
|---|---|---|---|
| 5,205,849 A | 4/1993 | Kosmyna | |
| 2006/0124145 A1* | 6/2006 | Schmidt | A24D 3/066 131/331 |
| 2008/0006250 A1* | 1/2008 | Bula | F02C 7/052 123/184.21 |
| 2009/0139192 A1* | 6/2009 | Sams | B01D 45/12 55/449 |
| 2013/0183214 A1* | 7/2013 | Metteer | A61L 9/015 422/123 |
| 2014/0096683 A1* | 4/2014 | Azwell | B01D 46/30 55/327 |
| 2014/0224658 A1 | 8/2014 | Richardson | |
| 2015/0323217 A1* | 11/2015 | Krichtafovitch | F24F 13/28 95/79 |
| 2016/0177893 A1* | 6/2016 | Finn | F02M 35/0223 95/291 |
| 2016/0206169 A1* | 7/2016 | Hyun | B04C 5/28 |
| 2017/0224887 A1* | 8/2017 | Minskoff | B01D 19/0036 |
| 2017/0333918 A1* | 11/2017 | Hua | B04C 11/00 |
| 2018/0361290 A1* | 12/2018 | Suzuki | F02M 26/50 |
| 2019/0024913 A1* | 1/2019 | Schmitz | B03C 3/014 |
| 2019/0091702 A1* | 3/2019 | Hyun | A47L 5/362 |
| 2020/0370768 A1* | 11/2020 | Wennerström | B03C 3/45 |
| 2021/0071904 A1* | 3/2021 | Park | F24F 8/10 |

FOREIGN PATENT DOCUMENTS

| | | |
|---|---|---|
| CN | 106256451 | 12/2016 |
| CN | 206214916 | 6/2017 |
| CN | 107282302 | 10/2017 |

* cited by examiner

VENTILATION ASSEMBLY

FIELD OF APPLICATION

The present invention is generally applicable to the ventilation sector and refers both to the room ventilation and to the assisted ventilation of people.

More in detail, the present invention relates to the air treatment of air used for room ventilation or for the assisted breathing of people.

BACKGROUND ART

As known, there is often the need to create an air stream between one point and another. Typically, this is achieved by means of ventilation assemblies which create such air stream between an intake channel, whose inlet draws the air from the area in which it is placed, and a delivery channel whose outlet supplies the air to the area of interest.

Some examples are the forced ventilation and/or room conditioning assemblies that create an air stream between the outside and a closed room. Other examples, however, refer to air purifying devices that draw air from the room in which they are and re-inject it into the same room after having purified it. Further simpler examples are the assisted breathing assemblies typically used in the medical field.

In all the aforementioned examples, in addition to the intake channel and the delivery channel, a device designed for generating the air stream between the two is present. Generally, this device is an electric powered mechanical fan, but it can be of different origin, such as for example the Ambu bags which are manually operated.

It is also known that air contains elements such as particles and micro-organisms that compromise its purity. These elements are normally breathed by people, however they represent a health hazard. In this sense, therefore, the ventilation assemblies typically comprise a filtering section of the air stream designed to retain as much as possible the particulate and, in some cases, to sanitize the flow itself by eliminating or reducing its bacterial load.

The known filtering sections are constituted by filtering barriers suitable for being traversed by the air stream and having a lattice sufficiently thin to retain the particulate even of small dimensions. In other cases, such as in the case of vacuum cleaners, a cyclonic filter is often used. The latter is based on the generation of a cyclonic air stream so that the particulate slams against the filter walls and is collected by falling.

In all such cases what is observed is that the filtering section constitutes a considerable obstacle to the air stream. For example, in the case of filtering barriers, the need to filter small particles requires the use of a material with very narrow and thick lattice. Therefore, the pressure drop of the air stream is evident. This aspect is of considerable importance since the air stream pressure is typically vital for the good operation of the assembly and this forces to adopt air stream generation devices which are more powerful than what would be necessary. This is not only expensive in terms of production costs of the ventilation assembly, but also in terms of energy consumption during use. It is therefore typically necessary to reach a compromise by sacrificing the quality of filtering. Alternatively, larger filters must be provided, which however are very cumbersome and expensive. In this latter case, however, it influences its use in the biomedical sector since their placement with respect to the patient and the machinery is problematic.

In the case of cyclonic filters, however, collection by falling is not always effective, so that often they have in any case an additional filtering barrier.

Presentation of the Invention

The object of the present invention is to overcome at least partially the drawbacks pointed out above by providing a ventilation assembly which allows to obtain an outlet air stream in which the presence of particulate and bacterial load is at most equal to the equivalent assemblies of the known art.

Another object of the present invention is to provide a ventilation assembly whose filtering section has an inferior obstacle to the air stream with respect to the equivalent assemblies of the prior art.

A further object is that the assembly of the invention presents a filtering section which is not cumbersome or which, having the same overall dimensions, has a filtering efficiency higher than the equivalent assemblies of the prior art.

Another object is that the assembly of the invention is less expensive than the known equivalent assemblies both in terms of production costs and in terms of operating costs.

Said objects, as well as others which will become more apparent below, are achieved by a ventilation assembly according to the following claims, which are to be considered as an integral part of the present patent.

In particular, it comprises at least one air intake channel from the surrounding room and at least one delivery channel. At least one air stream generating device is operatively connected thereto, which starts from the inlet of the intake channel (drawing air from the surrounding area) and is blown through the outlet of the delivery channel.

According to an aspect of the invention, the assembly includes a filtering section of the air stream to decrease, if not eliminate, the presence of particulate in the air stream itself. In this sense, the filtering section can be arranged at any point between the intake channel inlet and the delivery channel outlet.

According to another aspect of the invention, the filtering section comprises at least one filter having a containment body provided with an intake opening and a delivery opening for the air stream which must pass through it. The same filter comprises, inside the containment body, one or more air-tight bulkheads and shaped to force the air stream to collide with the bulkheads themselves. The latter, however, have at least a section portion suitable for being penetrated by the particulate in the air stream.

Advantageously, therefore, the collision of air against the walls causes the collision of the particulate with the same and, consequently, penetrates and remains trapped there. Still advantageously, there is no danger, as happens in the cyclonic ventilation assemblies, that the air stream takes back in a part of such particulate.

Since the air stream cannot traverse the bulkheads, they typically accompany it from the intake conduit to the delivery conduit. Advantageously, therefore, they do not constitute a serious obstacle to the passage of air thereby ensuring a lower load than in the prior art.

Still advantageously, the filtering section of the assembly of the invention is smaller than in the prior art with the same filtering efficiency.

Moreover, since the filters of the assembly of the invention offer a reduced obstacle with respect to the filters of the known equivalent ventilation assemblies, the assembly of the invention is less expensive both in terms of execution costs and in terms of energy consumption during the operation step.

According to another aspect of the invention, since it has been said that the filters which constitute the filtering section of the invention are small with respect to the known equivalent filters, in the assembly of the invention the filtering section comprises two or more filters arranged operatively in parallel with each other and/or two or more filters arranged operatively in series with each other. Advantageously, therefore, with the same overall dimensions, the air filtering efficiency of the assembly of the invention is strongly increased with respect to the equivalent assemblies of the prior art since it derives from the collaboration of multiple filters.

Moreover, in the case of known filters, the filtering efficiency, depending on the size of the lattice, does not benefit greatly by arranging the filters in series. On the contrary, with such configuration the obstacle to the air stream is often increased in an unacceptable manner. In the case of the invention, on the other hand, since the filtering takes place in a different manner, the overall efficiency increases by adding filters in series.

BRIEF DESCRIPTION OF THE DRAWINGS

Further features and advantages of the invention will become more apparent in light of the detailed description of a preferred but not exclusive embodiment of a ventilation assembly according to the invention, illustrated by way of non-limiting example with the aid of the accompanying drawings, wherein.

DETAILED DESCRIPTION OF SOME PREFERRED EXEMPLARY EMBODIMENTS

Figure 1:
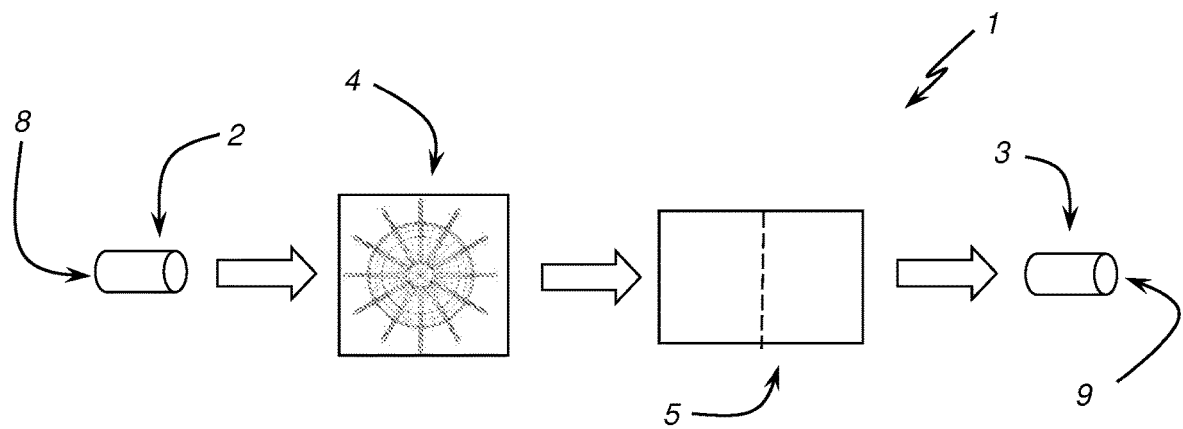
FIG. 1 represents a ventilation assembly according to the invention in a schematic view.

With reference to the above-mentioned figures, and in particular to FIG. 1, described herein is a ventilation assembly 1 according to the invention.

The ventilation assembly 1 can be used for various purposes. As said, the present invention is not limited to assemblies with forced ventilation of mechanical or electromechanical origin, but also to differently operated assemblies such as those operated manually.

In any case, like all such assemblies, even that of the invention comprises at least an air intake channel 2 from the room surrounding the opening of the intake channel 2 itself. There is also a delivery channel 3 for blowing the air at the destination, where the destination may be the oral cavity of a person or a closed room where there is a need to replace or condition the air.

The assembly 1 of the invention further comprises an air stream generating device 4 between the intake channel 2 and the delivery channel 3.

As mentioned above, the generating device 4 can be constructed in different ways. For example, it can consist of a fan or a vacuum pump or a manually operated Ambu bag. In other words, the embodiment of such a component can be of any type and should not be considered as limiting for the invention since what matters is that the generating device 4 generates the air stream between the intake channel 2 and the delivery channel 3. It follows that the ventilation assembly 1 of the invention is typically of the type for forced ventilation.

It is also apparent that the number of intake and delivery channels as well as the number of air stream generating devices are not limiting features of the present invention since in the described ventilation assembly, they may be in any quantity whatsoever according to the requirements of use.

According to an aspect of the invention, the assembly 1 also comprises a filtering section 5 of the air stream to decrease, if not cancel, the presence of particulate in the air coming out from the delivery channel 3.

For this purpose, it is apparent that the positioning of such filtering section 5 is irrelevant for the purposes of the invention. In other words, it can be arranged at any point between the inlet end 8 of the intake channel 2 and the outlet end 9 of the delivery channel 3.

Also, the number of filtering sections is not to be intended as a limiting characteristic for the invention since in the ventilation assembly that is described they can also be in any quantity whatsoever according to the requirements of use.

Figure 2:
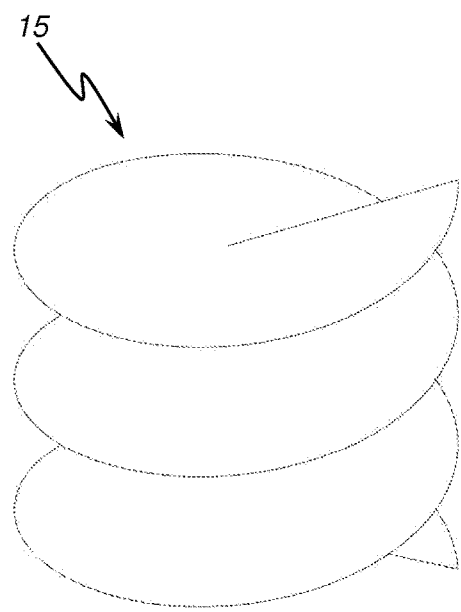
FIGS. 2 and 3 represent some details of the ventilation assembly of FIG. 1.

According to another aspect of the invention, the filtering section 5 comprises at least one filter 10, visible in FIG. 2, having a containment body 12 provided with an intake opening 13 and a delivery opening 14 for the air stream passing through it. Typically, the containing body 10 has a cylindrical shape, but even this aspect must not be considered as limiting for the invention, the shaping of the containment body being of any type. Also, the number of intake and delivery openings are non-limiting characteristics of the invention, such openings being able to be in any number whatsoever.

Figure 3:
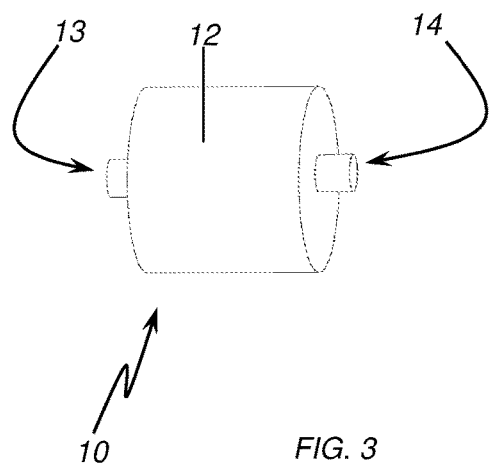
Figure 4:
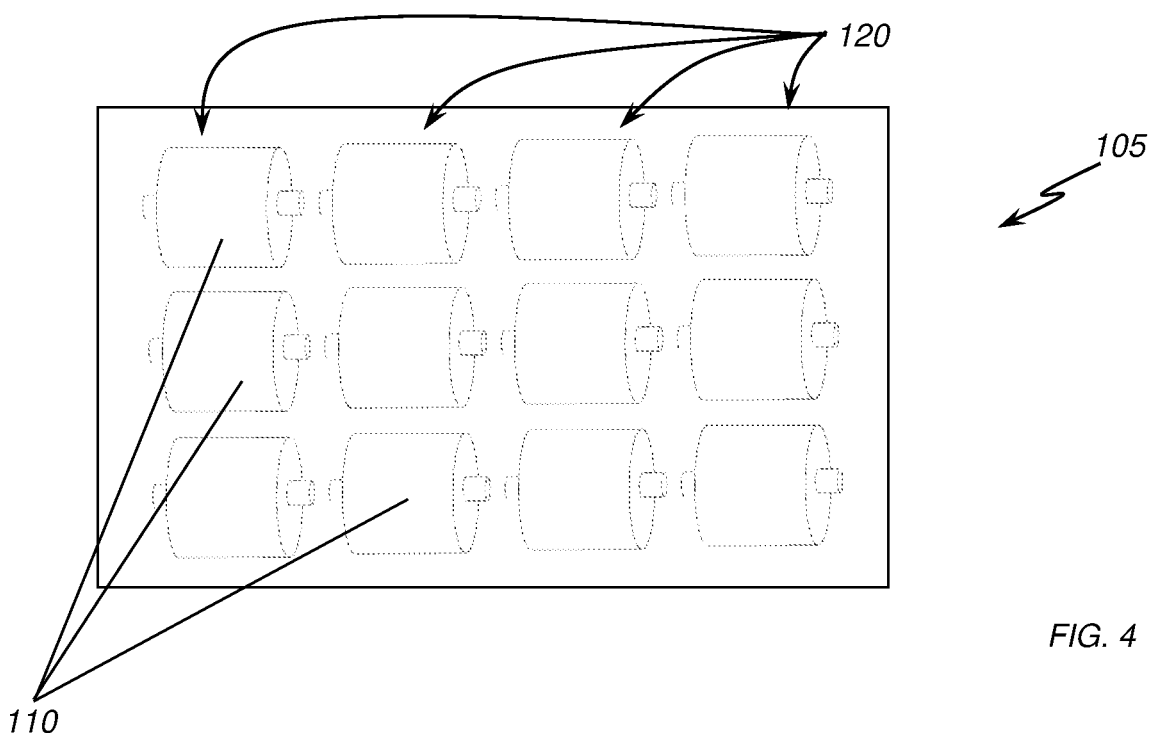
FIGS. 4 and 5 show some details of a variant embodiment of the ventilation assembly of the invention in a schematic view.
Figure 5:
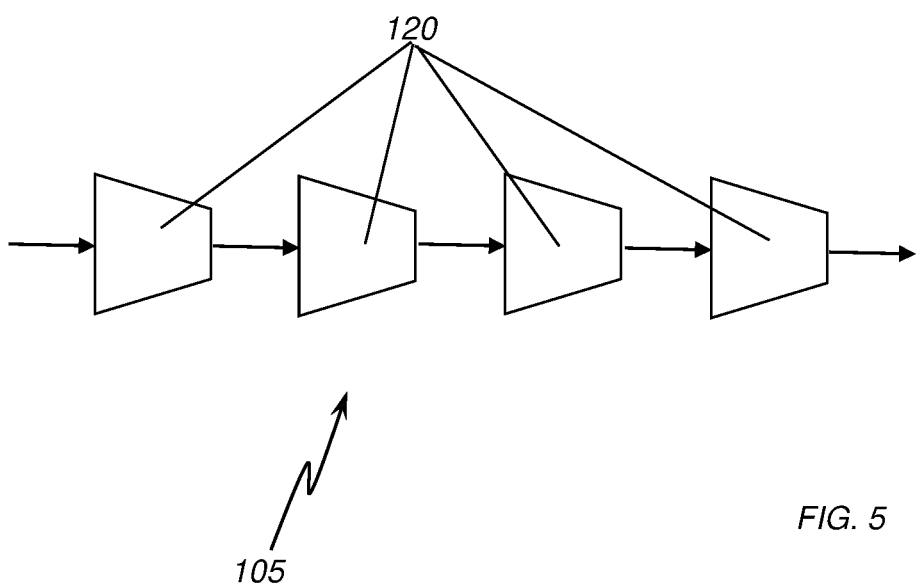

According to a further aspect of the invention, the filter 10 comprises, inside it, a bulkhead 15 visible in FIG. 3. It is air-tight and shaped to force the air stream to collide with it and with the inner walls of the containment body 12 in transit between the intake opening 13 and the delivery opening 14. Furthermore, the bulkhead 15 and the inner walls of the containment body 12 have a section portion, starting from the surface of the bulkhead 15, suitable to be penetrated by the particulate present in the air stream.

Advantageously, therefore, the bulkheads 15 are arranged in such a way that the air stream follows a path which causes it to have one or more collisions with them and with the aforementioned inner walls. However, since both the bulkhead 15 and the containment body 12 are air-tight, the bulkhead 15 typically accompanies the air stream between the intake opening 13 and the delivery opening 14 thus constituting a minimum obstacle to such flow with respect to known filters where the air stream must pass through the bulkhead. Still advantageously, the collisions of the air stream with the bulkhead 15 and the walls of the containment body 12 also lead also the particulate and the bacteria that the stream itself carries to collide with them. Due, therefore, to the section portion, they penetrate into the bulkhead 15 and into the containment body 12 and are retained there. Therefore, the risk, as in the cyclonic filters, that a part of the particulate is collected again by the air stream and brought to the delivery opening 14 is avoided.

As a consequence, not only does the filter 10 constitute a lower load compared to the known technique for the air stream, softly affecting the pressure of the same, but also allows to obtain an excellent filtering efficiency obtaining at least equal results, if not generally higher, to known equivalent filters.

Typically, the section portion suitable for retaining the particulate in the air stream consists of a layer of material with viscoelastic features arranged to cover the surface of the bulkhead 15 and the inner walls of the containment body 12. An example, in this sense, is the use of water-based or fat-based gel. However, this feature should not be considered as a limiting feature for the invention. The section portion subjected to collisions, in fact, can be made differently. According to another embodiment, in fact, the bulkhead and containment body are made of a single material and the section portion consists of a superficial softening of the material itself. According to another embodiment of the invention, the whole bulkhead can be penetrated by the particulate.

According to another aspect of the invention, however, a portion of the bulkhead 15 is ionized to attract and retain ionized particulates, but also this feature of the invention should not be considered as limiting.

It is apparent that also the number of bulkheads in the filter 10 is not a limiting feature for the invention since they can be in any quantity whatsoever according to the purposes of use of the ventilation assembly 1.

However, according to a further aspect of the invention, the shaping of the bulkhead 15 is made in such a way as to promote not only collisions of the air stream with itself, but also the passage of such stream from the intake opening 13 to the delivery opening 14. In this sense, according to the exemplary embodiment of the invention represented in the figures, the bulkhead 15 has a helical shape. This allows, advantageously, to reduce the obstacle opposite to the air stream in transit and at the same time, generating turbulence, to promote the greatest number of collisions between the particulate contained therein and the bulkhead 15.

Obviously, even such aspect must not be considered as limiting for the invention. The bulkheads, in fact, can be shaped in any way provided that they constitute the smallest possible obstacle to the air stream and the most equal to the equivalent filters of the prior art. It is apparent that any shaping is able to generate turbulence inside the filter 10 and it satisfies the purpose correctly.

For example, according to another embodiment of the invention, not shown in the drawings, the bulkheads are more than one and shaped to provide a labyrinthine path for the air stream.

Moreover, according to a further exemplary embodiment of the invention, also not shown in the figures, the helical bulkhead has a variable and decreasing pitch between the intake opening and the delivery opening. In this case, advantageously, there is a progressive reduction of the passage section and a further increase in turbulence effect.

According to a further aspect of the invention, however, a turbulence generator is present close to the intake opening 13 of the filter 10, although not shown in the figures. According to some exemplary embodiments, the latter consists of aerodynamic profiles having the function of generating controlled turbulence. This allows, advantageously, to be able to shape the bulkheads 15 so as to reduce the head losses while maintaining an excellent turbulence value inside the filter 10. Said profiles can be, according to different embodiments of the invention, multiples and with a differentiated passage section (also decreasing to obtain a blowing effect).

As it has been seen, therefore, the filter 10 of the filtering section 5 has, with the same operation effectiveness on the air stream, smaller dimensions than in the prior art. This allows, using the same overall dimensions, to use several filters 10 in combination.

In this sense, according to a variant embodiment of the invention represented in FIG. 4, the filtering section 105 comprises a first plurality 120 of filters 110 operatively arranged in parallel with each other. In this way, advantageously, the operation of the filters 110 on the air stream is partitioned by reducing the obstacle offered to the stream itself (and thus decreasing the negative effect on the stream pressure).

As a result, according to another aspect of the invention, the embodiment variant also has the arrangement, operatively in series, of first plurality 120 of filters 110 which, as can also be inferred from FIG. 5, allows to increase the filtering efficiency of the air stream.

Advantageously, therefore, it is possible to choose to arrange multiple filters 110 operatively in series and/or in parallel to keep the impact on the air stream pressure low while increasing the filtering efficiency.

It is evident that the combination in series and parallel between filters and filter groups may be of any type without departing from the scope of protection of the present patent.

To point out these aspects, it should be noted that some examples of filters of the known art have diameters having sections with a diameter in order of 10 cm and lengths also in the order of 10 cm. In the case of the invention, an equivalent filter 10 has a section with a diameter of 1 cm and a length even less than a centimetre. It is evident, therefore, that in the same volume numerous filters 10 according to the invention can be arranged in parallel and in series. In particular, ten filters 10 can be arranged in series on a single line, substantially increasing the filtering efficiency tenfold.

Operatively, therefore, the generating device 4 induces an air stream between the intake channel 2 and the delivery channel 3 by drawing air from the outside. When the air stream passes through the filtering section 5, it passes through the filter 10. The helical conformation of the bulkhead 15 accompanies the air stream towards the outlet of the filter 10 with a minimum obstacle.

However, the turbulence that is created causes collisions between the suspended particulate in the air stream and the bulkhead 15. The particulate then penetrates the bulkhead 15 and remains trapped there.

In light of the foregoing, it is understood that the ventilation assemblies of the invention reach all the intended purposes.

In particular, it allows to obtain an outlet air stream in which the presence of particulate and bacterial load is at most equal to the equivalent assemblies of the prior art while presenting a reduced obstacle to the air stream with respect to the equivalent assemblies of the known art.

Ultimately the assembly of the invention presents a filtering section which is not cumbersome or which, having the same overall dimensions, has a filtering efficiency higher than the equivalent assemblies of the prior art. It is also less expensive both in terms of production costs and in terms of operating costs.

The invention might be subject to many changes and variants, which are all included in the appended claims. Moreover, all the details may furthermore be replaced by other technically equivalent elements, and the materials may be different depending on the needs, without departing from the protection scope of the invention defined by the appended claims.

The invention claimed is:

1. A ventilation assembly comprising:

an intake channel (2) of air from a surrounding room;

a delivery channel (3);

a generating device (4) of an air stream between said intake channel (2) and delivery channel (3); and a filtering section (5; 105) of the air stream to decrease or eliminate a presence of particulate in the air stream, said filtering section (5; 105) being operatively positioned at any point of the ventilation assembly (1) between an inlet end (8) of said intake channel (2) and an outlet end (9) of said delivery channel (3), wherein said filtering section (5; 105) comprises at least one filter (10; 110) having:

a containment body (12) provided with an intake opening (13) and a delivery opening (14) for the air stream passing therethrough; and further comprising one or more air-tight bulkheads (15), arranged within said containment body (12) and shaped to force the air stream to flow between, and collide with, said one or more bulkheads (15) and inner walls of said containment body (12), said one or more bulkheads (15) and said containment body (12) having at least one section portion with an air-tight outer layer made of a gel, which is configured to be impacted by, and retain therein, the particulate in the air stream, said one or more bulkheads (15) identifying a path free of obstacles for the air stream between said intake opening (13) and said delivery opening (14), wherein said one or more bulkheads (15) have a helical shape.

2. The ventilation assembly according to claim 1, wherein said outer layer of said section portion of said one or more bulkheads is softer than a remainder of said bulkheads.

3. The ventilation assembly according to claim 1, wherein at least a portion of said one or more bulkheads (15) is ionized to attract and retain ionized particles.

4. The ventilation assembly according to claim 1, further comprising at least one turbulence generator arranged proximal to said intake opening of said filter.

5. The ventilation assembly according to claim 1, wherein said containment body (12) is shaped as a cylinder.

6. The ventilation assembly according to claim 1, wherein said at least one filter in said filtering section (105) comprises two or more of said filters (110) operatively arranged in parallel with each other.

7. The ventilation assembly according to claim 1, wherein said at least one filter in said filtering section (105) comprises two or more of said filters (110) operatively arranged in series with each other.

8. The ventilation assembly according to claim 1, wherein said generating device (4) of said air stream comprises a mechanical fan.

* * * * *